(12) United States Patent
Bier

(10) Patent No.: US 8,129,618 B2
(45) Date of Patent: Mar. 6, 2012

(54) CABLE JOINT

(75) Inventor: Bruce Bier, Warren, NJ (US)

(73) Assignee: Richards Manufacturing Company, a New Jersey Limited Partnership, Irvington, NJ (US)

( * ) Notice: Subject to any disclaimer, the term of this patent is extended or adjusted under 35 U.S.C. 154(b) by 838 days.

(21) Appl. No.: 12/207,267

(22) Filed: Sep. 9, 2008

(65) Prior Publication Data

US 2009/0065250 A1  Mar. 12, 2009

Related U.S. Application Data

(60) Provisional application No. 60/971,107, filed on Sep. 10, 2007.

(51) Int. Cl.
*H02G 15/08* (2006.01)
*G08B 5/00* (2006.01)

(52) U.S. Cl. .................. 174/72 R; 174/88 R; 174/84 R; 248/49; 340/815.4

(58) Field of Classification Search ................ 174/72 R, 174/88 R, 84 R, 73.1, 59, 50, 41, 653, 68.1, 174/68.3; 248/49, 65, 122.1, 200; 439/258, 439/259, 271, 272, 283, 296; 340/815.4
See application file for complete search history.

(56) References Cited

U.S. PATENT DOCUMENTS

| | | | | |
|---|---|---|---|---|
| 3,359,460 A * | 12/1967 | Ragone et al. | .................. | 174/41 |
| 3,617,811 A * | 11/1971 | McVoy | .......................... | 174/59 |
| 3,717,717 A * | 2/1973 | Cunningham et al. | ....... | 174/73.1 |
| 4,778,948 A * | 10/1988 | Fitch et al. | .................. | 174/88 R |
| 5,912,431 A * | 6/1999 | Sheehan | ....................... | 174/653 |
| 6,506,975 B2 * | 1/2003 | De Buyst | .................... | 174/88 R |

* cited by examiner

*Primary Examiner* — Angel R Estrada
(74) *Attorney, Agent, or Firm* — Stroock & Stroock & Lavan LLP

(57) ABSTRACT

A cable joint assembly may include a base and a plurality of removable legs connected to the base, each leg preferably including a limiter. A securing assembly preferably maintains the leg connected to the base. The securing assembly preferably includes an indicator for providing a visual indication whether or not the corresponding limiter is blown. The base is preferably constructed and arranged such that the indicator is visible and accessible to facilitate removal of the blown limiter.

20 Claims, 7 Drawing Sheets

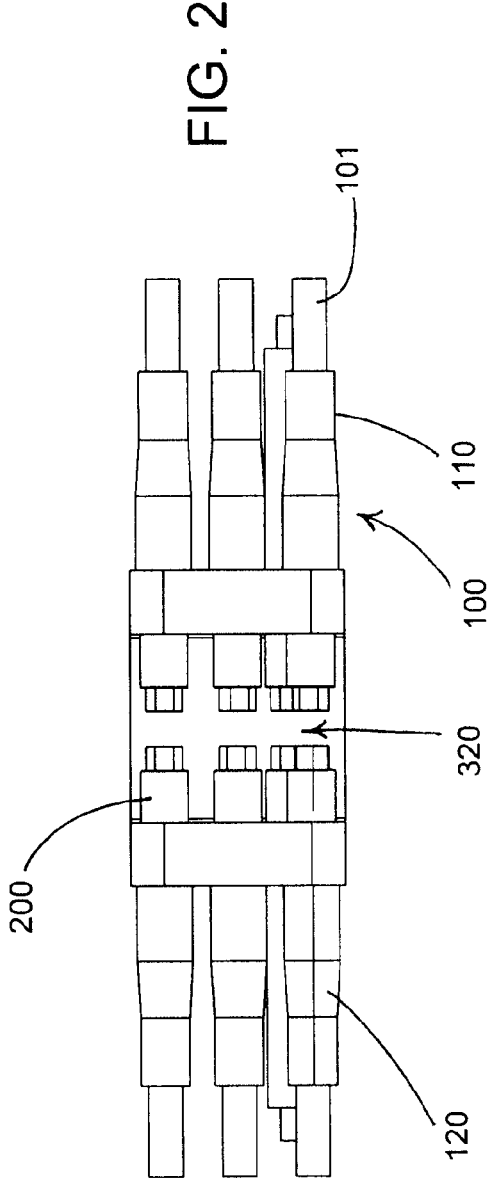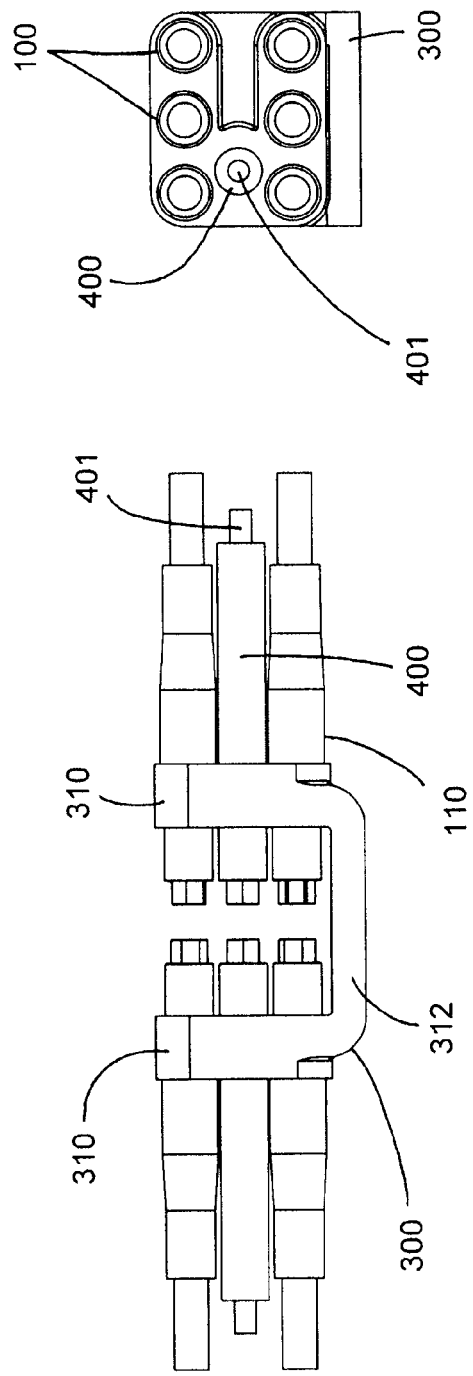

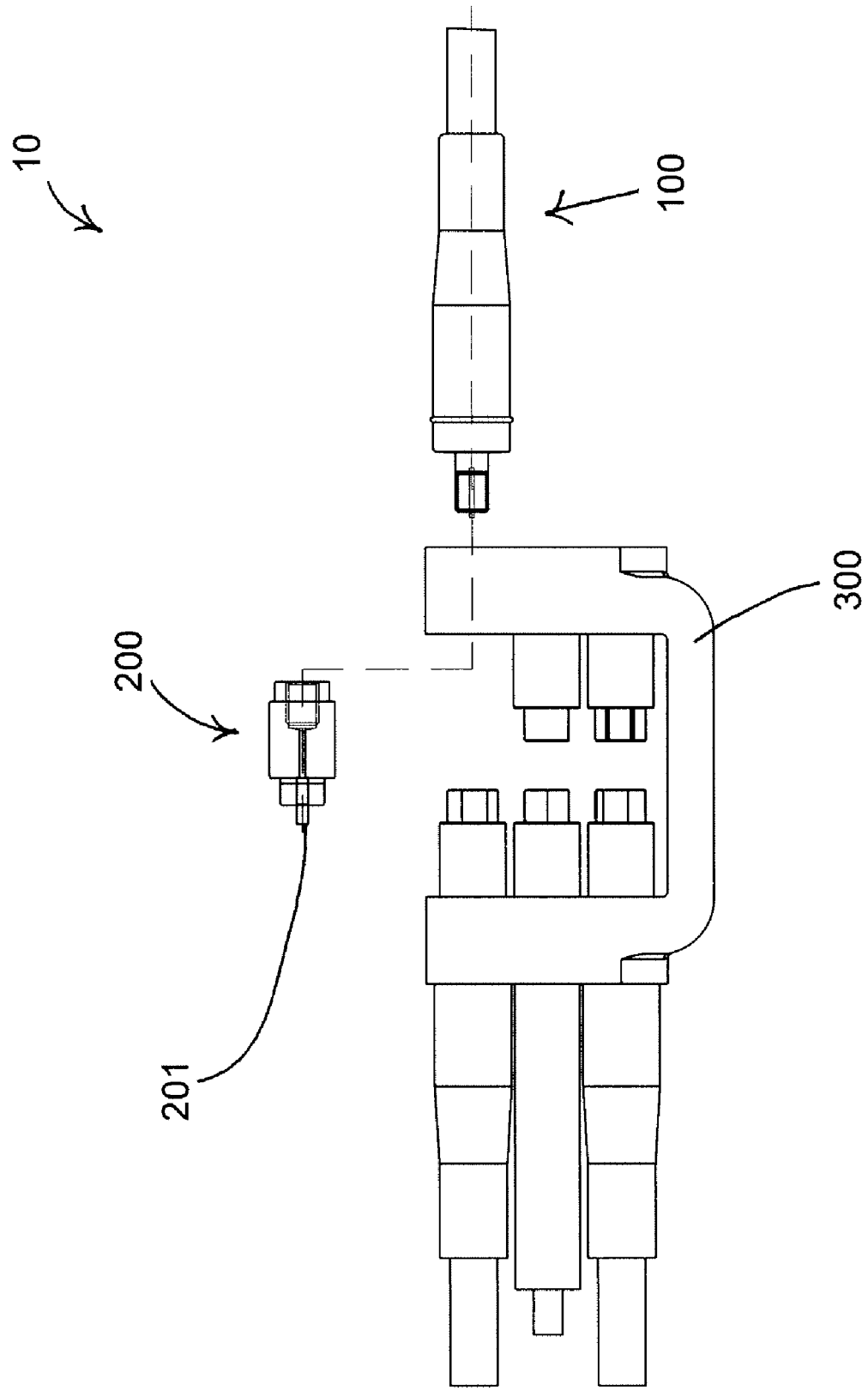

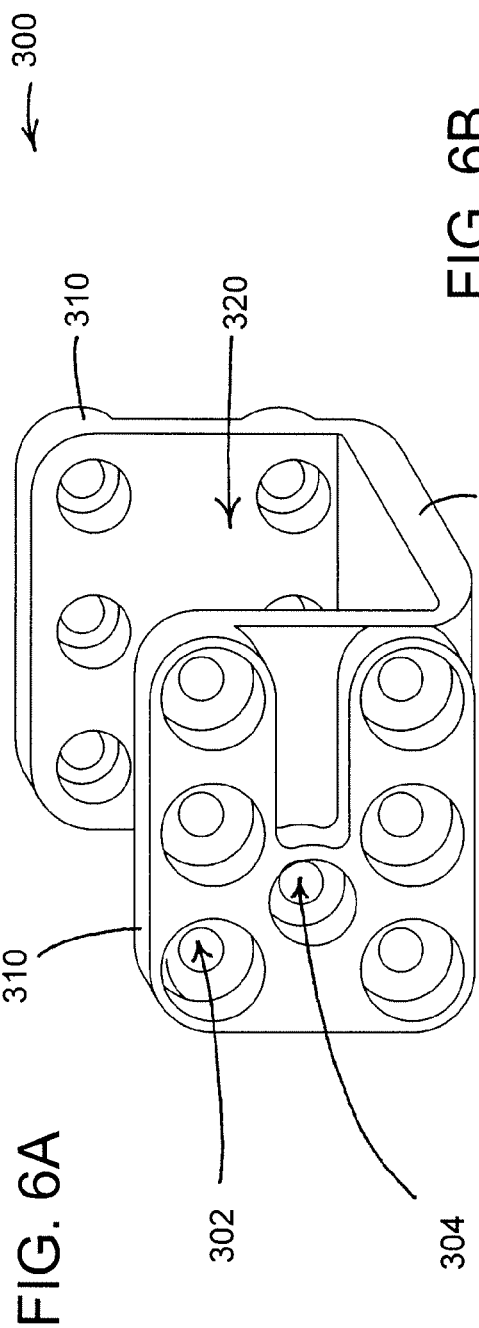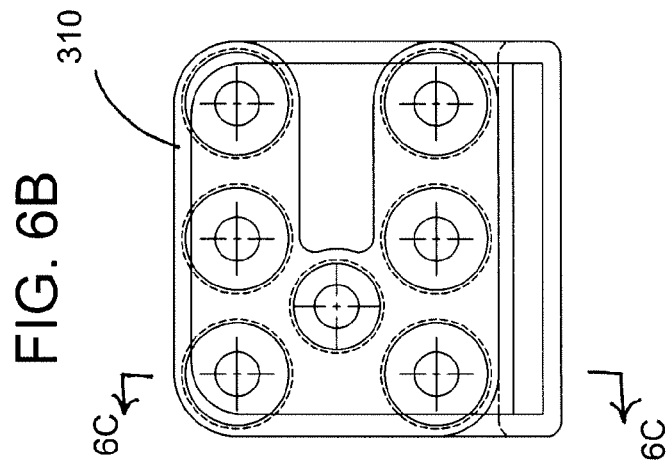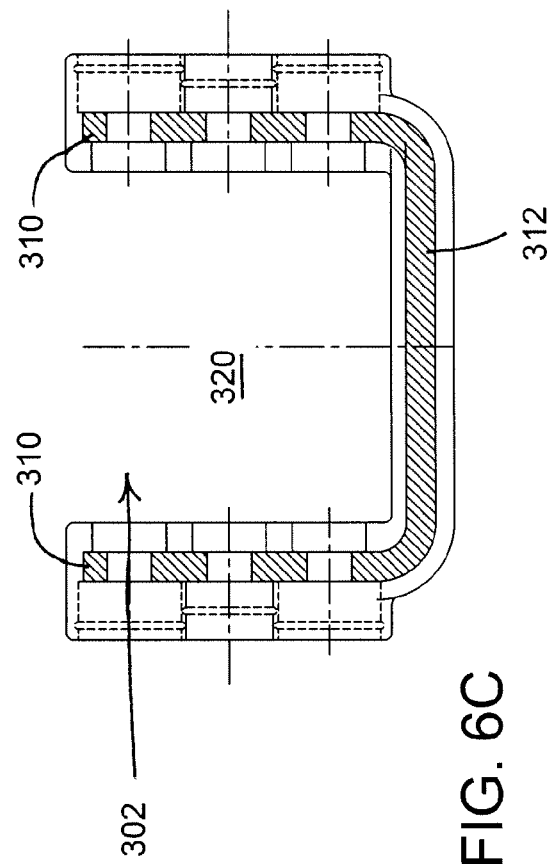

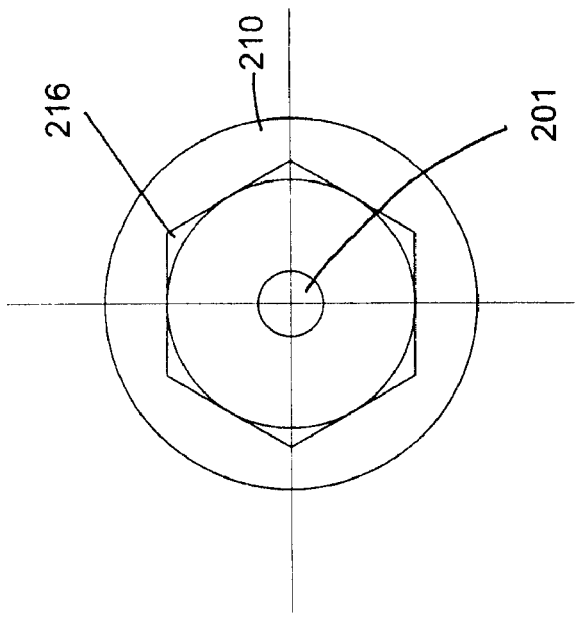
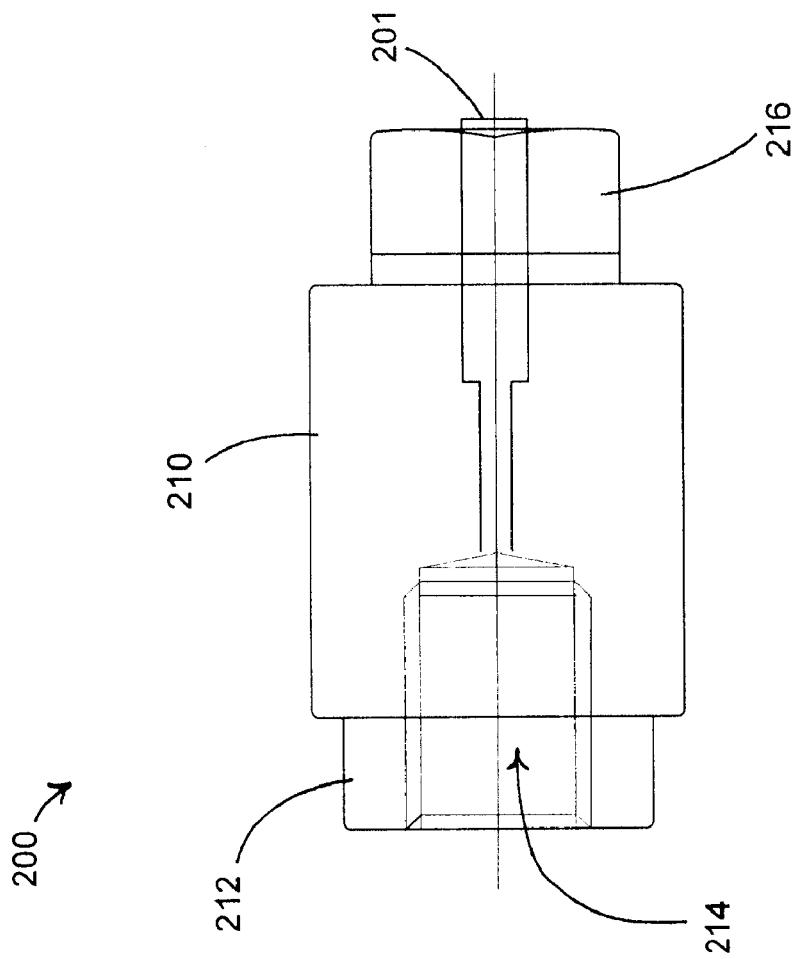
FIG. 9B
FIG. 9A

CABLE JOINT

CROSS REFERENCE TO RELATED

This application claims the benefit of U.S. Provisional Application Ser. No. 60/971,107 filed on Sep. 10, 2007 entitled "CABLE JOINT", which is hereby incorporated in its entirety by reference.

BACKGROUND OF THE INVENTION

When distributing electricity underground, cable joints are commonly used to make multiple cable connections. One type of joint that is used at secondary voltages (600 volts or lower) is a permanent, rubber molded product having lengths of a cable ("pigtails" or "legs") connected to a copper bus that makes up the conducting element of the joint. During installation, the splicer installs the joint by compressing one end of a copper tube on the cable pigtails and the other end of the copper tube on the cable. The connection is then insulated using tape, a rubber sleeve or a piece of heat shrink insulation.

Joints can typically connect up to 7 cables on each side. Each pigtail is called a "leg." Each leg can include an integral fuse section. Like any fuse its purpose is to interrupt faults. In the prior art joints, for 120/216V applications, the fuse is a section of the bus of the joint with a smaller cross section than the rest of the bus. That smaller cross section will heat up faster than the rest of the bus. When a certain amount of current flows through that smaller section, the copper will melt, interrupting that leg.

One drawback of the commonly available 120/216V pigtail joints is that the fuses are not individually replaceable. As such, if a fuse blows on a leg the connection is disrupted and that leg becomes useless. The leg is therefore usually cut off and the cable that was connected to that leg is then connected to a fresh leg. Once all the legs become useless, or if the joint can no longer provide enough connections, the joint is often cut out and replaced. Accordingly, it is common practice to use a joint having more legs than necessary.

The joint is typically rubber molded in its entirety to seal against water ingress. This can cause other drawbacks. For example, with the prior art joints it can be difficult to tell if one or more of the fuses has blown without making contact with the cable on each side of the fuse.

Accordingly, it is desirable to provide a joint that overcomes these and other drawbacks of the joints currently available in the market.

SUMMARY OF THE INVENTION

The present invention is directed towards a rubber sealed, waterproof multi-cable underground joint that can be connected via compression connections using pigtails, with each pigtail comprising a replaceable limiter and a blown limiter indicator.

Preferably, the joint includes a U-shaped copper bus having a plurality of pigtails connected to each side of the U. The replaceable limiters are preferably positioned on the outside of the U, with the associated blown limiter indicators preferably positioned on the inside of the U. Other arrangements are possible and contemplated herein. The U-shaped orientation of the joint provides benefits over the prior art design in that the user can simply look down the short axis of the joint to determine which, if any, of the limiters are blown.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE DRAWINGS

The particular features and advantages of the invention as well as other objects will become apparent from the following description taken in connection with the accompanying drawings, in which:

FIG. 2 is a top planar view of the cable joint assembly of FIG. 1;

FIG. 3 is a front elevational view of the a cable joint assembly of FIG. 1;

FIG. 4 is a side elevational view of the cable joint assembly of FIG. 1;

FIG. 5 is a front elevational view of the cable joint assembly of FIG. 1;

FIG. 6A is a perspective view of a base of a cable joint assembly in accordance with an embodiment of the invention;

FIG. 6B is a side elevational view of the base of FIG. 6A;

FIG. 6C is a cross sectional view of the base of FIG. 6B taken along line 6C-6C;

FIG. 9A is a front elevational view of an indicator in accordance with an embodiment of the invention; and FIG. 9B is a side view of the indicator of FIG. 9A.

DESCRIPTION OF EXEMPLARY EMBODIMENTS

Figure 1:
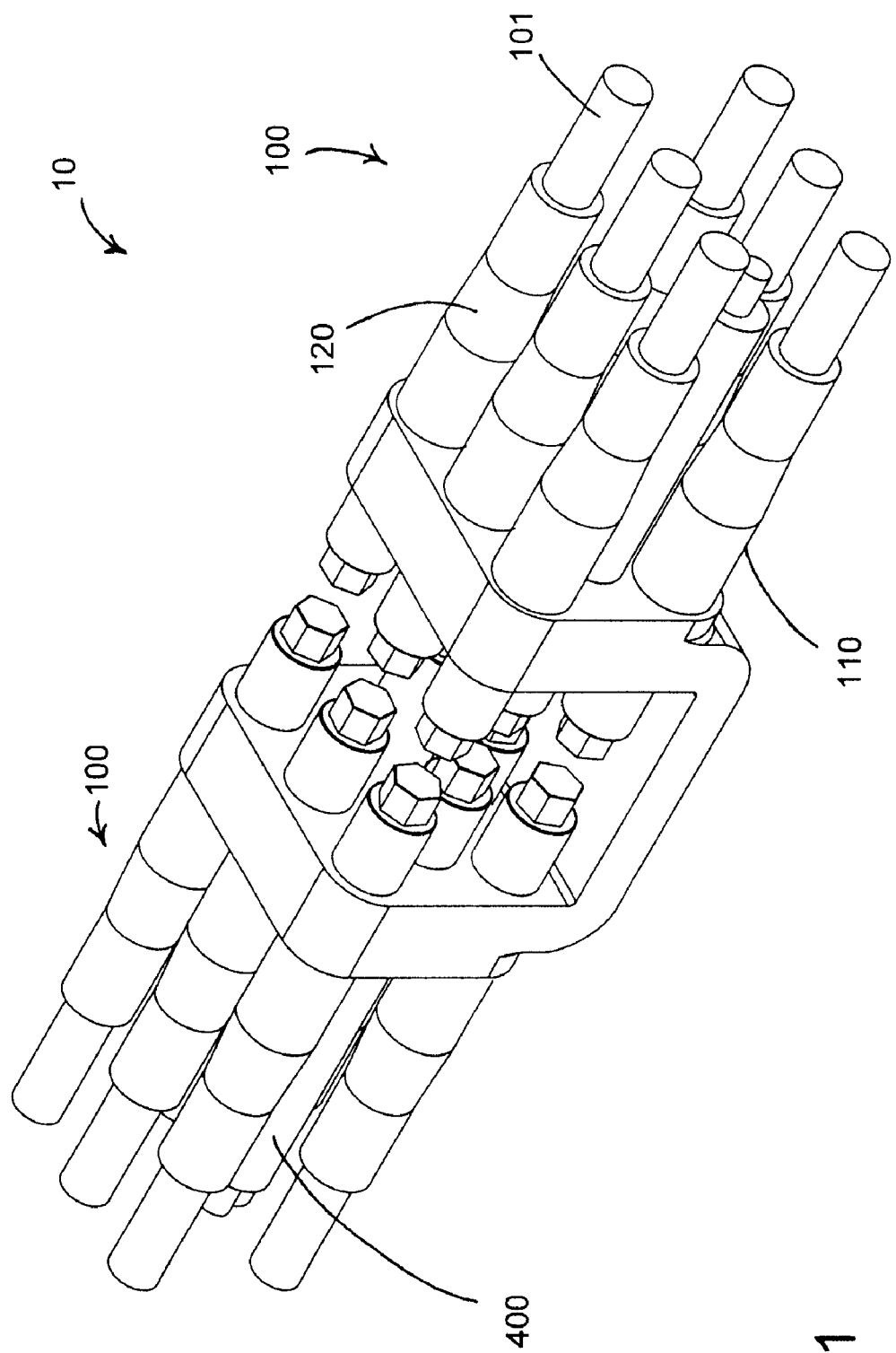
FIG. 1 is a perspective view of a cable joint assembly in accordance with an embodiment of the invention.

In accordance with an exemplary embodiment of the invention as shown in FIGS. 1-5, a cable joint 10 has a base 300 connected to a plurality of legs 100. By way of a non-limiting example, joint 10 can include twelve legs 100, which may connect to twelve cables. Referring to FIGS. 1-6, base 300 can have 2 side walls 310 connected by a connecting wall 312 between side walls 310, with one or more legs 100 connected to side walls 310. As shown, side walls 310 and connecting wall 310 can create a channel 320 which is preferably visible and accessible by the technician.

In the embodiment illustrated, joint 10 has six legs 100 on each side of base 300. Legs 100 can be connected via compression connections to base 300. Preferably, each side of base 300 also includes at least one non-fused connector 400 having a cable 401 to create a "ring" bus for the purpose of balancing the electric load on more than one crab joint of the same phase. Said cable 401 is connected to another cable 401 of a nearby crab joint of the same phase (A,B,C) thereby creating the "ring bus" (i.e., an electrical reference point). In accordance with an exemplary embodiment, base 300 includes a ring-aperture 304 for receiving non-fused connector 400.

Figure 7:
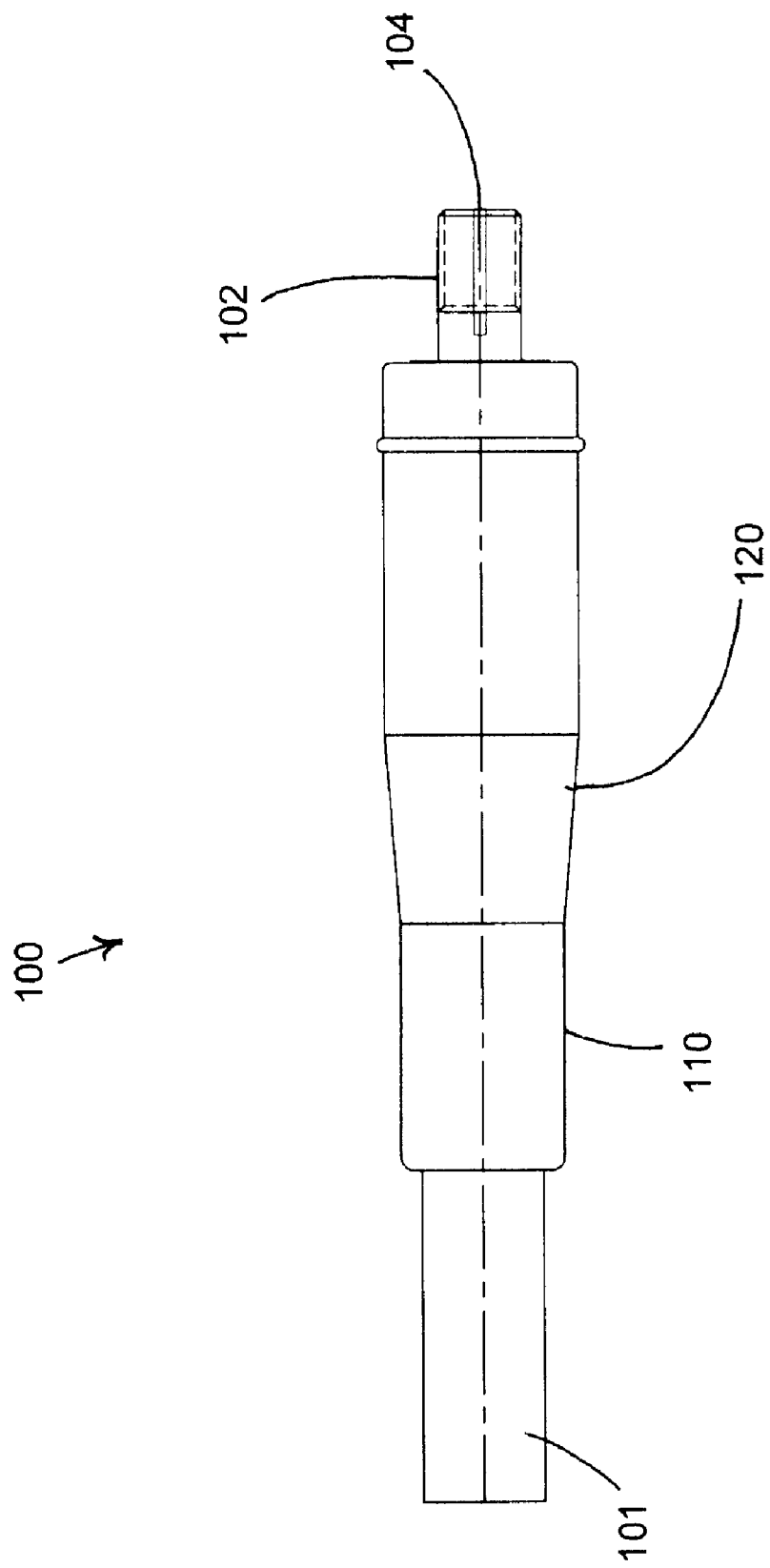
FIG. 7 is a front elevational view of a limiter in accordance with an embodiment of the invention.
Figure 8:
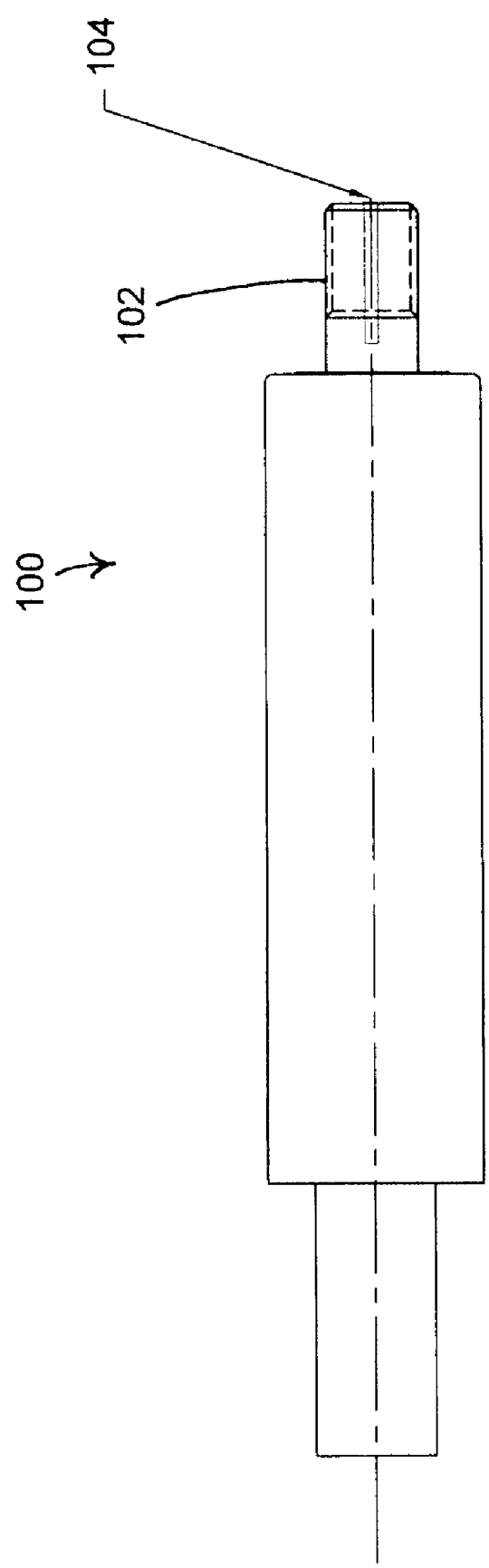
FIG. 8 is a front elevational view of a limiter in accordance with an embodiment of the invention.

As shown in FIGS. 5-7, legs 100 can each include a projection 102 at an end of leg 100 connected to joint 10. Projection 102 is preferably received in a corresponding aperture 302 in base 300 as shown in FIGS. 6A-6C, and partially extends through the respective side wall 310 of base 300 and preferably into channel 320. Projection 102 preferably includes an indicator actuator 104 which can actuate the indicator 201 of securing assembly 200 (FIGS. 9A-9B) to indicate that the corresponding limiter is blown.

As shown in FIGS. 1-6, base 300 can have a U-shape, thus rendering the portion of legs 100 that extend through base 300, for example, projection 102, visible and accessible. For example, the removal, adjustment or installation of legs 100 can be facilitated by channel 320 providing access to projection 102.

Preferably, legs 100 are removably engaged with base 300, thus facilitating replacement of legs 100. One non-limiting example of the way in which legs 100 are removably retained in position is the use of securing assemblies 200. Securing assemblies 200 can hold legs 100 in place by engaging the portion of legs 100 that extend through side wall 310 of base 300, for example, projection 102. In accordance with the embodiment of securing assembly 200 illustrated in FIGS. 9A-9B, securing assembly 200 can include a housing 210, a projection 212 having a cavity 214 therein. Projection 212 is preferably inserted into aperture 302 of side wall 310 of base 300 to engage projection 102 of leg 100. Cavity 214 preferably receives projection 102 of leg 100. Securing assembly 200 can include a nut 216 to facilitate maintaining securing assembly 100 in position, and more particularly for maintaining securing assembly 200 connected to leg 100. An indicator 201 can be provided within housing 210 and preferably extends through housing nut 216. In accordance with the embodiment shown in FIG. 9A, indicator 201 extends from cavity 214 through housing 210 and slightly past nut 216 when in the retracted, or default stage when the corresponding limiter is not blown. When the corresponding limiter is blown, indicator 201 can extend into an extended position as shown in FIG. 5, thus providing a visual indication that the corresponding limiter is blown. Preferably, indicator 201 contacts or otherwise is operatively connected to indicator actuator 104 of projection 102 of leg 100. Therefore, when the limiter 120 is blown, indicator actuator 104 can activate indicator 201 to extend into the extended position.

When a securing assembly 200 is removed from a leg 100 as illustrated in FIG. 5, for example, when the limiter is blown, the leg 100 can be removed by removing projection 102 from aperture 302. A new leg 100 can be installed by inserting its projection 102 into aperture 302 and securing leg 100 in place by connecting a securing assembly 200 to projection 102. Securing assembly 200 can include a nut or otherwise suitable retaining element to facilitate maintaining securing assembly 200 connected to leg 100. As securing assembly can also be provided for maintaining non-fused connector 400 connected to base 300.

The U-shape of the embodiment of base 300 as shown in FIGS. 1-6 can also provide a visual indication that legs 100 are properly connected. However, it is to be understood that base 300 need not have a U-shape, but can have a variety of shapes, dimensions and arrangements without deviating from the scope of the invention. For example, without limitation, base 300 can include a cup shape wherein securing assemblies 200 are visible and accessible through the opening, a ring shape, a partial ring shape, two adjacent walls connected directly without a connecting wall, three or more walls having one or more legs 100 connected thereto, a single wall having one or more legs 100 connected thereto, etc., without deviating from the scope of the invention. Additionally, base 300 can include an enclosed structure such as a cube, preferably having a window or other mechanism through which securing assemblies 200 can be visible.

Legs 100 are preferably constructed and arranged to connect to a cable, for example, electric cables on the primary or secondary side of a transformer, more preferably on the second side of the transformer. A leg 100 as shown in FIG. 1 can include a cable 101 that is electrically connected to and surrounded by a bus 110, preferably a copper bus, of joint 10. During installation, cable 101 can be inserted into a copper tube, and the copper tube can be compressed onto cable 101. Likewise, the other end of the copper tube can be compressed onto the cable that is being connected to joint 10.

In accordance with the embodiment shown in FIGS. 1-5 and FIGS. 7-8, bus 110 of leg 100 can also comprise a limiter 120 constructed and arranged to interrupt leg 100 when there is a fault in leg 100. Limiter 120 preferably has a smaller cross section than the remaining portions of bus 110 and is constructed and arranged to heat up faster than the rest of bus 110. More specifically, in accordance with an exemplary embodiment of the invention, when a predetermined amount of current flows through limiter 120, limiter 120 will melt, thus interrupting leg 100.

Referring to FIGS. 1-5 and 9A-9B, securing assembly 200 is preferably connected to leg 100 in such a way that once limiter 120 melts and leg 100 is interrupted, an indicator 201 of the corresponding securing assembly 200 becomes apparent, for example by extending out from securing assembly 200. Therefore, a person looking at joint 10 will be given a visual indication that a leg 100 has been interrupted, as well as facilitating identifying the specific interrupted leg.

As discussed above, leg 100 is preferably removable. Therefore, once a leg 100 is interrupted, it can be removed from base 300 as shown in FIG. 5 and a new leg 100 can be installed, rather than being cut off and left unusable such as commonly known joints currently available in the market. The cable that was connected to the interrupted leg can then be connected to the replacement leg 100 and be connected to base 300 using the same aperture 302 as the original leg 100. Therefore, the legs can be replaced multiple times for one or more cables being connected thereto without reducing the total number of legs available on joint 10, which can provide a substantial benefit to joints commonly known and currently available in the market. For example, the number of legs available and being used in joint 10 in accordance with an embodiment of the invention can remain the same whether or not one or more legs 100 have been interrupted. Even if every leg 100 is interrupted, the same base 300 can be kept in place while legs 100 are replaced with new legs 100 having new limiters 120, thus rendering it suitable for connection to the cables.

Joint 10 is preferably insulated, for example, by being rubber molded and sealed, which can also help prevent water ingress or moisture from entering joint 10. This can be preferably at least because joints are commonly buried underground. Securing assemblies 200 are visible by a person looking at joint 10 to determine whether or not a leg has been interrupted. Preferably, ring bus 400 is also attached to base 300 in a similar manner as legs 100 and is also removable. As discussed above, a securing assembly 200 can also be used to secure ring bus 400 onto base 300.

Certain embodiments of base 300 have been described herein as being connected to one or more legs 100, legs 100 comprising bus 110 and limiter 120, otherwise, a "pigtail." However, it is to be understood that other variations are contemplated as a matter of application specific design choice. By way of non-limiting example, base 300 may be connected directly to cable 101, a connector or any other device without deviating from the scope of the invention.

The examples provided are merely exemplary, as a matter of application specific to design choice, and should not be construed to limit the scope of the invention in any way. Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the number of legs or ring buses, sides to the base, etc. can be varied without deviating from the scope of the invention. Other non-limiting examples of alternate embodiments include using another method of insulation can be used rather than rubber molding, using a metal other than copper for the bus, and the type of limiter provided to interrupt the leg. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

I claim:

1. A cable joint assembly for an electrical distribution system, the cable joint assembly comprising:
   a base having a plurality of apertures;
   a plurality of legs having a channel for receiving an electrical distribution power cable, each leg having a first end constructed and arranged to be inserted into one of the apertures of the base; and
   a plurality of securing assemblies, each securing assembly constructed and arranged to connect to the first end of a corresponding leg to secure the leg to the base;
   wherein disconnecting the securing assembly from the first end of the leg releases the leg from the base, and wherein a replacement leg can be inserted into the aperture.

2. The cable joint assembly of claim 1 wherein at least one of the legs includes a limiter constructed and arranged to prevent flow of electricity through the leg.

3. The cable joint assembly of claim 2 wherein a securing assembly of the at least one of the legs includes an indicator which provides a visual indication that the limiter is blown.

4. The cable joint assembly of claim 2 wherein the base securing assembly includes an indicator having a retracted default position and an extended position when the limiter is blown.

5. The cable joint assembly of claim 1 wherein the base securing assembly is visible.

6. The cable joint assembly of claim 1, the base having a plurality of side walls defining a channel therebetween, wherein the legs extend outwardly from the base and the securing assemblies extend into the channel.

7. The cable joint assembly of claim 1 wherein the base includes a rectangular shape having a window through which the securing assemblies can be seen.

8. The cable joint assembly of claim 1 wherein the securing member is a rotatably mountable onto the first end of the leg.

9. The cable joint assembly of claim 1 wherein the base includes a ring bus.

10. The cable joint assembly of claim 1 wherein the cable joint assembly is insulated.

11. The cable joint assembly of claim 1 wherein the cable joint assembly is rubber sealed.

12. The cable joint assembly of claim 1 wherein the legs are connected to the base via a compression connection.

13. A cable joint assembly comprising:
   a base;
   a leg having a limiter constructed and arranged to connect a cable to the base, the limiter having a first state wherein electricity is free to flow through the leg, and a second state when electricity is prevented from flowing through the leg; and
   a securing assembly, each securing assembly constructed and arranged to connect to the first end of the leg to secure the leg to the base;
   the securing assembly including an indicator having a default position when the limiter is in the first state and an extended position when the limiter is in the second state, thus providing a visual indication of whether or not electricity is free to flow through the leg.

14. The cable joint assembly of claim 13 wherein the leg is selectively removable and replaced with a replacement leg.

15. The cable joint assembly of claim 13, the base having a plurality of side walls defining a channel therebetween, wherein the legs extend outwardly from the base and the securing assemblies extend into the channel.

16. The cable joint assembly of claim 13 wherein the securing member is rotatably mountable onto the first end of the leg.

17. The cable joint assembly of claim 13 wherein the base includes a ring bus.

18. The cable joint assembly of claim 13 wherein the cable joint is rubber sealed.

19. The cable joint assembly of claim 13 wherein the legs are connected to the base via a compression connection.

20. A cable joint assembly comprising:
   a base;
   a leg constructed and arranged to connect a cable to the base;
   the leg having a limiter having a first state wherein electricity is free to flow through the leg, and a second state when electricity is prevented from flowing through the leg; and
   a securing assembly, each securing assembly constructed and arranged to connect to the first end of the leg to secure the leg to the base;
   the securing assembly including an indicator having a default position when the limiter is in the first state and an extended position when the limiter is in the second state, thus providing a visual indication of whether or not electricity is free to flow through the leg;
   wherein disconnecting the securing assembly from the first end of the leg releases the leg from the base, and wherein a replacement leg can be inserted into the aperture.

* * * * *